United States Patent [19]
Hensel

[11] 3,821,059
[45] June 28, 1974

[54] SEGMENTALLY ACCOMMODATING LOOSE-LAY FLOOR
[75] Inventor: Robert D. Hensel, Millersville, Pa.
[73] Assignee: Armstrong Cork Company, Lancaster, Pa.
[22] Filed: Apr. 5, 1972
[21] Appl. No.: 241,358

[52] U.S. Cl............ 161/36, 161/116, 161/145, 161/146, 161/160, 156/277, 264/52, 264/DIG. 5, 264/DIG. 18
[51] Int. Cl............................................ B32b 3/10
[58] Field of Search............ 161/413, 160, 161, 36

[56] References Cited
UNITED STATES PATENTS
| 2,556,884 | 6/1951 | Muller | 161/39 |
| 3,393,109 | 7/1968 | Dorst | 161/36 |
| 3,445,320 | 5/1969 | Boivin | 161/83 |
| 3,516,898 | 6/1970 | Cook | 161/36 |
| 3,660,211 | 5/1972 | Brody | 161/413 |
| 3,684,630 | 8/1972 | Sensenig et al. | 161/160 |

Primary Examiner—George F. Lesmes
Assistant Examiner—William R. Dixon, Jr.

[57] ABSTRACT

A decorative loose-lay surface covering having a resilient thermoplastic decorative wear layer and a resilient foamed thermoplastic backing layer specifically adapted for absorbing movement between the loose-lay surface covering and the subfloor with which it is in contact. The backing layer is constructed such that there are a plurality of rigid elements separated by a resilient and compliant matrix in a plane parallel to the upper surfaces of the covering and subfloor.

1 Claim, 5 Drawing Figures

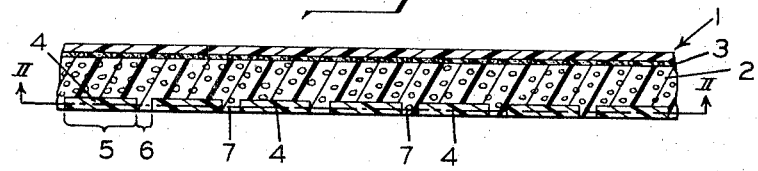
Fig. I
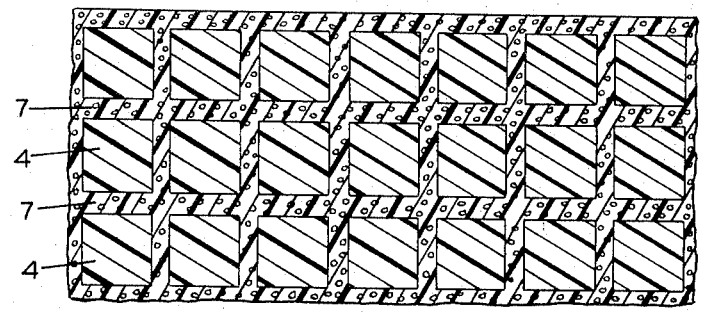
Fig. II
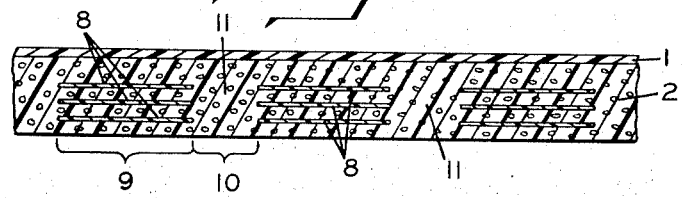
Fig. III
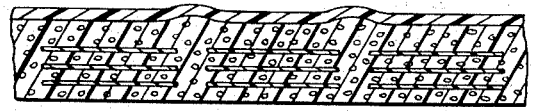
Fig. IV
Fig. V

SEGMENTALLY ACCOMMODATING LOOSE-LAY FLOOR

BACKGROUND OF THE INVENTION

1. Field of the Invention

This invention relates to loose-lay surface coverings having a resilient thermoplastic decorative wear layer.

2. Description of the Prior Art

Decorative surface coverings having a resilient thermoplastic decorative wear layer are well known and have been in widespread use for a long period of time. Many of these products which have been utilized in loose-lay type installations have been felt-base materials having a resilient thermoplastic decorative wear layer. When such conventional shet floors are installed over common subfloors, there is a potential for relative motion developing between the flooring and subfloor. A number of sources for this potential can be, by way of example, thermally caused dimensional changes of either or both the flooring and the subfloor, moisture level caused dimensional changes and manufacturing history caused time changes. These relative dimensional changes can cause buckles in the flooring, stretching of the flooring which will produce buckles with later movement, or failure of the floor to conform to the room dimensions.

SUMMARY OF THE INVENTION

The basic type of loose-lay decorative floor covering with which this invention is concerned is comprised of a thermoplastic decorative wear layer having a resilient cellular thermoplastic backing layer united thereto and, more particularly, to decorative floor coverings of plasticized poly(vinyl chloride) resin. I have found that any tendency toward buckling of the decorative floor covering may be minimized by incorporating rigid elements in the cellular backing layer in a plane parallel to the subfloor so that any force caused by movement between the loose-lay decorative floor covering and the subfloor is absorbed by distributing the force in a series of small distortions evenly throughout the resilient cellular structure, the rigid elements preventing a cumulative build-up force and thus preventing excessive buckling in any one localized area. By way of example, the rigid elements may be formed in the cellular backing as a series of rigid platelets distributed within the cellular structure, or they may be a series of rigid elements formed in the backing of the cellular material which is in contact with the subfloor. In each instance, the rigid elements are separated by a matrix of the cellular resilient backing, the relative dimensions of the rigid areas to resilient intervening areas being such that the linear dimension of a line passing through the main portion of the rigid areas and the intervening resilient areas in the plane parallel to the subfloor would be of larger linear dimension in the rigid area than in the intervening resilient area.

BRIEF DESCRIPTION OF THE DRAWING

Two embodiments of the invention are illustrated in the accompanying drawing in which:

FIG. I is a simplified diagrammatic representation of an enlarged section wherein rigid elements are incorporated in the cellular resilient backing in contact with the subfloor and are separated by a resilient matrix in the plane of the rigid elements parallel to the subfloor;

FIG. II is a sectional view taken along Line II—II of FIG. I diagrammatically illustrating the spacing of the rigid elements and the intervening resilient areas in a plane parallel to the upper surfaces of the subfloor and floor covering;

FIG. III is a simplified diagrammatic representation of a section of a floor product produced in accordance with this invention in which rigid platelets distributed throughout the resilient foamed backing layer form the rigid elements which are separated by a resilient matrix of cellular foamed material;

FIG. IV illustrates the distribution of displacements within the floor covering when the flooring of FIG. III is under compression; and FIG. V illustrates the distribution of displacements in the floor covering of FIG. III when the floor covering is under extension.

DESCRIPTION OF THE PREFERRED EMBODIMENTS

As described in the drawing and with reference to the figures illustrating the invention, the floor covering of this invention is basically comprised of a decorative thermoplastic wear layer 1 and a foamed resilient cellular thermoplastic backing layer 2 with, if desired, a fiber glass scrim and adhesive layer 3 to provide dimensional stability.

With reference to FIG. I, a series of rigid elements 4 are distributed in a plane parallel to the surface layer 1 and located so as to engage the subfloor when the flooring is placed loose-lay thereover. The spacing of the rigid elements 4 is such that the linear dimension 5 through any rigid element is greater than the linear dimension 6 of the intervening resilient matrix 7. FIG. II is a sectional view taken through line II—II of FIG. I and diagrammatically illustrates the spacing of the rigid elements 4 in the intervening matrix 7. As illustrated, the elements 4 are in the form of squares but obviously could be of any configuration, either regular or irregular, including configurations such as circles, triangles, etc. With reference to FIG. III, a series of rigid platelets 8 are distributed, in planes parallel to the wear layer, throughout the foamed resilient cellular backing 2, the spacing of the rigid platelets in a plane parallel to the wear layer 1 being such that the major linear dimension 9 of any rigid platelet 8 is greater than the linear dimension 10 of the intervening resilient matrix 11 formed by the cellular thermoplastic foam 2. FIGS. IV and V illustrate the distribution of displacements in the floor covering of FIG. III, under compression and extension, respectively, the rigid platelets 8 causing the forces to be absorbed evenly by the intervening matrixes 11 and preventing a cumulative build-up which would result in buckling in a localized area of the floor covering.

In forming the floor covering illustrated in FIGS. I and II, a layer of either foamable or nonfoamable poly(vinyl chloride) dryblend is laid up on a release backing and sintered. For purposes of illustration, a nonfoamable dryblend of the composition of Example 1 is deposited on a release carrier to a depth of about 50 mils by passage under a screed. This lay-up is sintered by heating for 1-½ minutes by passage through an oven at a temperature of 380° F., after which the sintered dryblend layer is ready for printing.

EXAMPLE 1

Composition of Dryblend

| Ingredients | Parts by Weight |
| --- | --- |
| Poly(vinyl chloride) homopolymer resin (Diamond PVC 450) | 100 |
| Plasticizer: Di-2-ethylhexylphthalate | 85 |
| Stabilizer: Dibutyl tin maleate | 2 |

To prepare the dryblend, the poly(vinyl chloride) homopolymer resin is added to a Henschel Mixer with the mixer operating at a low speed. The premixed stabilizer and plasticizer are added over a 2 to 3 minute period. When the temperature of the mix reaches approximately 230° F., the mix is discharged in the form of plasticized and stabilized particles of poly(vinyl chloride) dryblend.

After the dryblend layer has been sintered, a printed pattern is applied to the sintered backing, the printing being in the form of approximately 1 inch squares separated by about one-fourth inch of untreated material with the desired pattern being printed into the sintered dryblend by a rotary screen printer with an ink of the composition of Example 2.

EXAMPLE 2

Cross-Linkable Plastisol Printing Ink

| Ingredients | Parts by Weight |
| --- | --- |
| Poly(vinyl chloride) homopolymer (dispersion resin—Tenneco Blacar 1732) | 80 |
| Poly(vinyl chloride) homopolymer (blending resin—Goodyear Pliovic M-90) | 20 |
| Di-2-ethylhexylphthalate | 2 |
| Texanol isobutyrate | 8 |
| Octyl epoxy tallate (Drapex 4.4) | 5 |
| Lead 2-ethyl hexanoate (Nuodex V1060) | 3 |
| Trimethylolpropane trimethacrylate | 30 |
| Benzoyl peroxide (60% in dibutylphthalate) | 0.5 |
| Titanium dioxide dispersion grade pigment (58% in DOP) | 4.6 |
| Lead chromate based pigment (American Cyanamid (No. 40-1450) (57% pigment in DOP) | 2.0 |

After printing with a cross-linkable plastisol ink, a foamable dryblend of the composition of Example 3, prepared under conditions described in Example 1, is applied to a depth of 125 mils. The layers are then fused by passage through an oven at 430° F. with a residence time of 4 minutes with the layer containing a blowing agent foaming during the fusion step.

Example 3

Foamable Dryblend

| Ingredients | Parts by Weight |
| --- | --- |
| Poly(vinyl chloride) homopolymer (Diamond PVC 450) | 200 |
| Di-2-ethylhexylphthalate | 140 |
| Epoxidized soya oil (Admex 710) | 10 |
| Calcium-zinc laurate (Ferro 95-V-1) | 8 |
| Azodicarbonamide (Kempore 60) | 4.5 |
| 50 Mesh limestone | 20.0 |
| Silica gel (HiSil) | 1.5 |
| Titanium dioxide pigment | 4.4 |

On a separate release carrier, a dryblend layer of the composition of Example 4, prepared under conditions described in Example 1, is deposited to a depth of about 50 mils by passage under a screed. This layer is sintered by heating for 1-½ minutes by passage through an oven at a temperature of 380° F., after which it is ready for printing.

Example 4

Dryblend-Wear Layer

| Ingredients | Parts by Weight |
| --- | --- |
| Poly(vinyl chloride) homopolymer (Opalon 610) | 100 |
| Di-2-ethylhexylphthalate | 40 |
| Dibutyl tin maleate | 2 |

The desired pattern is then printed into the sintered dryblend by a rotary screen printer using a plastisol printing ink of the formulation of Example 5. The printed material is fused by passage through an oven at 500° F. with a residence time of 1.5 minutes.

Example 5

Plastisol Printing Ink

| Ingredients | Parts by Weight |
| --- | --- |
| Poly(vinyl chloride) homopolymer (dispersion resin—Tenneco Blacar 1732) | 100 |
| Di-2-ethylhexylphthalate | 33.5 |
| Texanol isobutyrate (2,2,4-trimethyl-1,3-pentanediol diisobutyrate | 17 |
| Dibutyl tin maleate | 2 |
| Pigments as desired | 1.5 |

The printed wear layer is then laminated to the foamed backing by stripping the wear layer from the carrier and laminating it to the foam backing which has been preheated to 230° F. Lamination is accomplished by passing both layers through the nip of two laminating rolls under pressure while at the same time passing a fiber glass scrim reinforcement into the nip beneath the foam backing layer while extruding an adhesive, having the composition of Example 6 and heated to a temperature of 390° F., into the nip in contact with the scrim.

The resilient surface covering thus formed may be rolled after the release carrier has been stripped from the backing and is ready for installation.

Example 6

Adhesives

| Ingredients | Parts by Weight |
| --- | --- |
| Poly(vinyl chloride) homopolymer (Escambia 2160) | 200 |
| Di-2-ethylhexylphthalate | 60 |
| Butyl benzyl phthalate | 12 |
| Epoxidized soya oil | 10.6 |
| Stabilizer containing triphenyl phosphite | 9 |

Example 6-Continued

Adhesives

| Ingredients | Parts by Weight |
|---|---|
| (Ferro 5245) | |
| Calcium carbonate | 2 |
| Titanium dioxide-pigment grade | 4.75 |

To illustrate the preparation of the floor covering illustrated in FIG. III, a foamable plastisol of the composition of Example 7 is applied to a release carrier to a depth of about 8 mils and is gelled by passage through an oven at about 250° F. with a residence time of 3 minutes.

Example 7

Foamable Plastisol

| Ingredients | Parts by Weight |
|---|---|
| Poly(vinyl chloride) homopolymer dispersion grade (Exon 605) | 37.50 |
| Poly(vinyl chloride) homopolymer dispersion grade (Stauffer SCC-20) | 37.50 |
| Poly(vinyl chloride) homopolymer dispersion grade (Pliovic M-70) | 25.00 |
| Azodicarbonamide (Kempore 60) | 2.5 |
| Zinc 2-ethyl hexanoate (ABC-18) | 1.5 |
| Octyl epoxy tallate (Drapex 4.4) | 5.0 |
| Di-2-ethylhexylphthalate | 50.0 |

This gelled layer is printed with a rotary screen using a curable ink of the composition of Example 8 applied in a block pattern. Immediately after printing, another coating of foamable plastisol is applied at approximately the same gage as the first coat and is gelled the same as the first layer of foamable plastisol.

A second printing of the same pattern using the same materials is made such that the inked areas are substantially in registration. The plastisol application and printing is repeated with three registered prints sandwiched between four layers of plastisol. The final plastisol layer is thicker than the lower three — being approximately 15 mils of foamable plastisol.

Example 8

Curable Ink

| Ingredients | Parts by Weight |
|---|---|
| Poly(vinyl chloride) homopolymer dispersion grade (Blacar 1732) | 80.0 |
| Poly(vinyl chloride) homopolymer dispersion grade (Pliovic M-90) | 20.0 |
| Di-2-ethylhexylphthalate | 1.5 |
| Texanol isobutyrate (plasticizer) | 10.0 |
| Octyl epoxy tallate (Drapex 4.4) | 5.0 |
| Stabilizer (Nuostabe V1060) | 3.0 |
| Pigment grade titanium dioxide | 2.5 |
| Trimethylol propane trimethacrylate (SR-350) | 20.0 |
| Benzoyl peroxide (60% in DBP) | 1.2 |

In the top layer a printed decoration was printed by rotary screens using plastisol inks of the composition of Example 2.

This decoration is covered with a plastisol clear coat of the formulation of Example 9 applied to a depth of 10 mils. The entire structure is fused and expanded by passage through an oven at 390° F. with a residence time of 4 minutes.

Example 9

Clear Coat

| Ingredients | Parts by Weight |
|---|---|
| Poly(vinyl chloride) homopolymer dispersion grade (Diamond PVC 71) | 30.0 |
| Poly(vinyl chloride) homopolymer dispersion grade (Blacar 1732) | 30.0 |
| Poly(vinyl chloride) homopolymer dispersion grade (Borden VC265) | 40.0 |
| Di-2-ethylhexylphthalate | 20.0 |
| Octyl epoxy tallate (Drapex 4.4) | 5.0 |
| Stabilizer (Nuostabe V1060) | 3.0 |
| Viscosity modified PE glycol—200 monolaurate | 2.0 |
| TIB | 13.4 |

The finished floor coverings may simply be placed loose on a subfloor and are generally thick enough and heavy enough to stay down without curling. At the same time, as the subfloor expands and contracts, the portions of the backing between the printed rigid areas buckle and stretch to absorb the movement readily in a localized area. The final effect is that the floor has many tiny buckles which are essentially unnoticeable rather than a large buckle.

What is claimed is:

1. A floor covering comprised of a thermoplastic decorative wear layer and a resilient foamed thermoplastic backing layer having a pattern formed of a plurality of relatively rigid elements in the resilient backing layer positioned in one or more planes parallel to the upper surface of the wear layer and spaced from one another and of such dimension that a line passing through the rigid elements and the intervening resilient areas in a plane are of larger linear dimension in the rigid area than in the intervening resilient area, said rigid elements being formed during manufacture by printing one or more layers of the fusible thermoplastic composition which is fused to form said backing layer in the desired pattern using a crosslinkable ink and crosslinking said ink at the time the backing layer is fused.

* * * * *